Patented Sept. 30, 1952

2,612,522

UNITED STATES PATENT OFFICE 2,612,522

ALKANOYL-α-ETHYLBENZYLUREAS

Robert Duschinsky, Essex Fells, N. J., assignor to Hoffmann-La Roche Inc., Nutley, N. J., a corporation of New Jersey No Drawing. Application July 15, 1950, Serial No. 174,117

3 Claims. (Cl. 260—553)

This invention relates to α-ethylbenzylureas and to the method for preparing the same. The new compounds can be represented by the following formula:

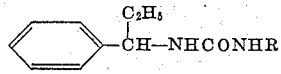

wherein R is a member of the group consisting of hydrogen and lower aliphatic carboxylic acyl. Compounds of the present invention are useful as anticonvulsants and analgesics.

The simplest member of the new compounds (R in the above formula being H) is α-ethylbenzylurea. It can be prepared by reacting α-ethylbenzylamine in the form of its acid addition salts with an alkali metal cyanate, as for example, sodium cyanate or potassium cyanate. When the optically active forms of α-ethylbenzylamine are employed, the optically active D-α-ethylbenzylurea and L-α-ethylbenzylurea are obtained. By acylating α-ethylbenzylurea with a lower aliphatic carboxylic acyl halide there are produced the corresponding compounds where R in the above formula is lower aliphatic carboxylic acyl.

The following examples will serve to illustrate the invention.

EXAMPLE 1

D,L-α-ethylbenzylurea

A solution of 13.5 grams of D,L-α-ethylbenzylamine in 25 cc. of methanol was neutralized with 50 cc. of 1.9 N hydrochloric acid and mixed with a solution of 8.9 grams of potassium cyanate in 20 cc. of water. The mixture was refluxed for 10 minutes and evaporated to about one-half of its original volume. D,L-α-ethylbenzylurea crystallized upon cooling. After recrystallization from 50 cc. of xylene, the compound had a melting point of 98–100° C.

EXAMPLE 2

D-α-ethylbenzylurea

A solution of 31.5 grams of D-α-ethylbenzylamine L-hydrogen malate in 150 cc. of water and 42 cc. of methanol was refluxed for 10 minutes with a solution of 21.3 grams of potassium cyanate in 48 cc. of water. The resultant solution was evaporated on the steam bath to about one-half of its original volume and cooled. D-α-ethylbenzylurea precipitated. After recrystallization from 250 cc. of benzene, the product had a melting point of 120–121° C.; $[\alpha]_D^{26} = +50.4°$.

EXAMPLE 3

L-α-ethylbenzylurea

A solution of 17.0 grams of L-α-ethylbenzylamine D-hydrogen tartrate in 75 cc. of water and 21 cc. of methanol was refluxed for 10 minutes with a solution of 10.7 grams of potassium cyanate in 15 cc. of water. The resultant solution was evaporated on the steam bath to about one-half its original volume and cooled. After cooling, L-α-ethylbenzylurea precipitated. Upon recrystallization from 150 cc. of benzene, the product melted at 119.5–121° C.; $[\alpha]_D^{26} = -50.0°$.

EXAMPLE 4

1-(α-ethylbenzyl)-3-acetylurea

A solution of 2 grams of D,L-α-ethylbenzylurea in 11 cc. of pyridine was treated while cooling with 970 mg. of acetyl chloride. The resultant mixture was heated on the steam bath for one-half an hour and then 25 cc. of water and 10 cc. of concentrated hydrochloric acid were added. 1-(α-ethylbenzyl)-3-acetylurea precipitated. After recrystallization from a mixture of 8 cc. of alcohol and 8 cc. of water, the compound melted at 88–89° C.

EXAMPLE 5

1-(α-ethylbenzyl)-3-propionylurea

A solution of 1.78 grams of D,L-α-ethylbenzylurea in 6 cc. of pyridine was treated while cooling with 1.15 grams of propionyl chloride. The resultant mixture was refluxed for 35 minutes. After cooling and addition of 20 cc. of water and 6 cc. of concentrated hydrochloric acid, 1-(α-ethylbenzyl)-3-propionylurea crystallized. After recrystallization from a mixture of 20 cc. of alcohol and 30 cc. of water, the compound had a melting point of 98–99° C.

I claim:
1. 1-(α-ethylbenzyl)-3-acetylurea.
2. 1-(α-ethylbenzyl)-3-propionylurea.
3. 1-(α-ethylbenzyl)-3-lower alkanoyl urea.

ROBERT DUSCHINSKY.

REFERENCES CITED

The following references are of record in the file of this patent:

Kann: "Ber. deut. chem.," vol. 27 (1894), p. 2308.

Brander: "Rec. Trav. chim. pays bas.," vol. 37 (1918), pp. 82–83.

Jones et al.: "J. Am. Chem. Soc.," vol. 48 (1926), pp. 179–180.

Harris et al.: "J. Am. Chem. Soc.," vol. 68 (1946), p. 847.

Montague et al.: "Comptes Rendus Acad. Sci.," vol. 191, (1930), p. 141.